(12) United States Patent
Ismert et al.

(10) Patent No.: US 7,207,530 B2
(45) Date of Patent: Apr. 24, 2007

(54) PIPE HOLD-DOWN WITH FLEXIBLE ISOLATING LEG

(75) Inventors: Joseph P Ismert, Kansas City, MO (US); Frank D Julian, Kansas City, MO (US)

(73) Assignee: Sioux Cheif Mfg. Company, Inc., Peculiar, MO (US)

( * ) Notice: Subject to any disclaimer, the term of this patent is extended or adjusted under 35 U.S.C. 154(b) by 0 days.

(21) Appl. No.: 10/882,590

(22) Filed: Jul. 1, 2004

(65) Prior Publication Data

US 2006/0000953 A1 Jan. 5, 2006

(51) Int. Cl.
*F16L 3/00* (2006.01)

(52) U.S. Cl. .............. 248/74.4; 248/67.7; 248/74.2

(58) Field of Classification Search ........ 248/74.3, 248/74.4, 74.2, 68.1, 65
See application file for complete search history.

(56) References Cited

U.S. PATENT DOCUMENTS

| | | | |
|---|---|---|---|
| 4,442,994 A | | 4/1984 | Logsdon |
| D276,134 S | * | 10/1984 | Ericsson ............... D8/396 |
| 4,903,920 A | * | 2/1990 | Merritt ................... 248/71 |
| 4,903,921 A | | 2/1990 | Logsdon |
| 4,961,554 A | * | 10/1990 | Smowton ............... 248/68.1 |
| 5,054,741 A | | 10/1991 | Ismert |
| D342,013 S | * | 12/1993 | Sachs ...................... D8/356 |
| 5,739,474 A | | 4/1998 | Bradley |
| 6,010,100 A | | 1/2000 | Merritt |
| 6,073,891 A | | 6/2000 | Humber |
| 6,164,604 A | | 12/2000 | Cirino et al. |
| 6,390,421 B1 | * | 5/2002 | Rudd ...................... 248/68.1 |
| 6,598,836 B1 | | 7/2003 | Leon |
| 6,666,415 B2 | | 12/2003 | Hansen |
| 6,682,025 B2 | * | 1/2004 | Turner et al. ............ 248/65 |
| D490,690 S | * | 6/2004 | Brass et al. ............. D8/354 |

FOREIGN PATENT DOCUMENTS

| | | |
|---|---|---|
| EP | 555550 A1 | 8/1993 |
| FR | 1312586 | 11/1962 |
| GB | 2099905 | 12/1982 |

OTHER PUBLICATIONS

Advertising materials of Sioux Chief Manufacturing Company, Inc. showing Tube Talon, Twin Talon, Padlock and Sioux Strap pipe hold-downs, each of which is believed to have been on sale for more than one year prior to the filing date of the present application.

* cited by examiner

*Primary Examiner*—Amy J. Sterling
*Assistant Examiner*—Steven Marsh
(74) *Attorney, Agent, or Firm*—Erickson & Kleypas, L.L.C.

(57) ABSTRACT

A pipe hold-down for securing a pipe to a building member includes a back having a base end, a distal end, and a fastener receiving aperture extending therethrough from the distal end to the base end. A claw extends outwardly from the back proximate the distal end thereof and curves toward the base end. A leg extends outwardly from the back proximate the base end thereof is more flexible than the back and bendable relative thereto. An opening is defined between a distal end of the claw and the leg. The leg is bendable between a normal position and a pipe admitting position wherein the leg is bent outwardly away from the claw, in the normal position the opening is substantially narrower than the outside diameter of the pipe and in the pipe admitting position the opening is at least as wide as the outside diameter of the pipe.

5 Claims, 3 Drawing Sheets

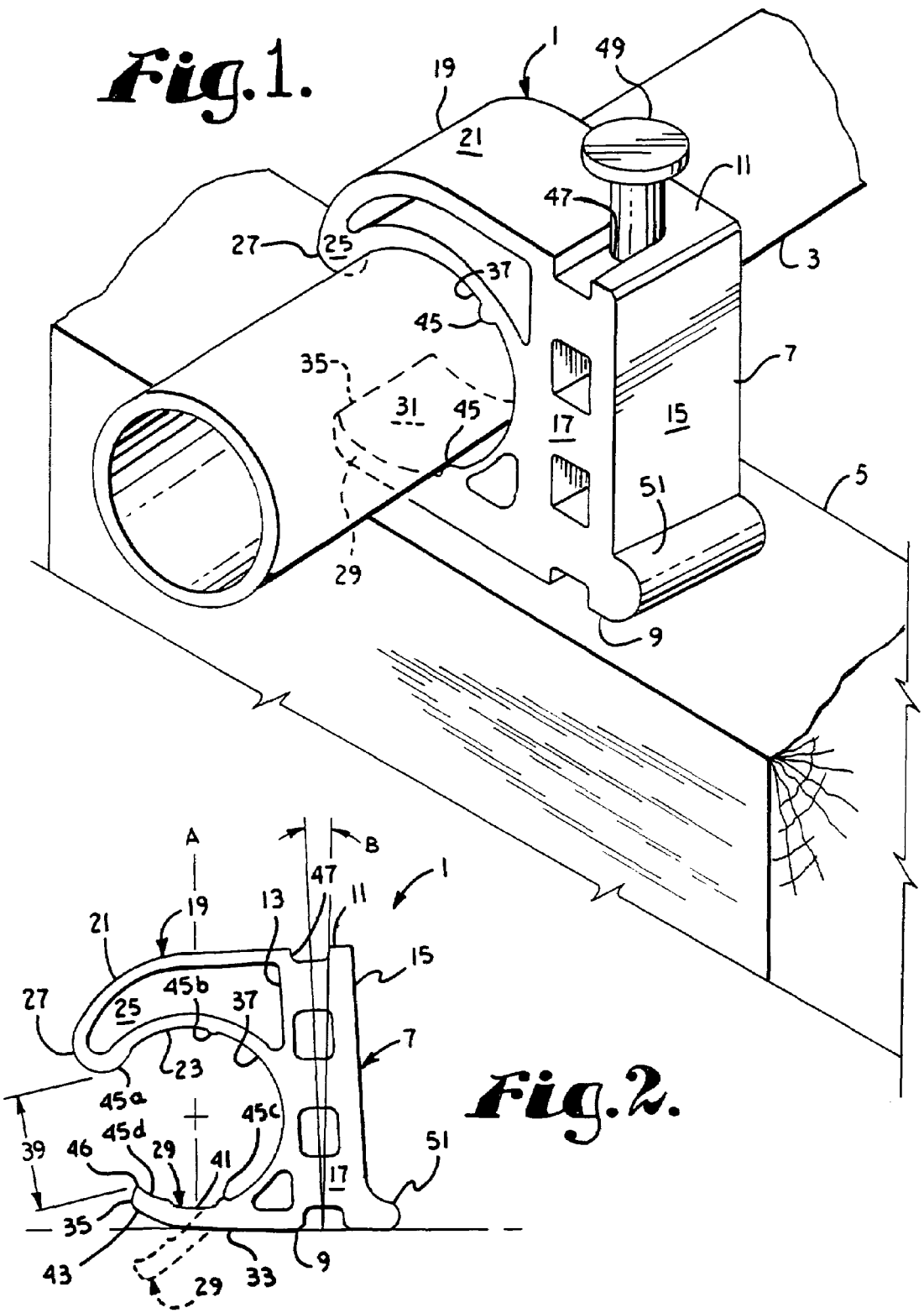

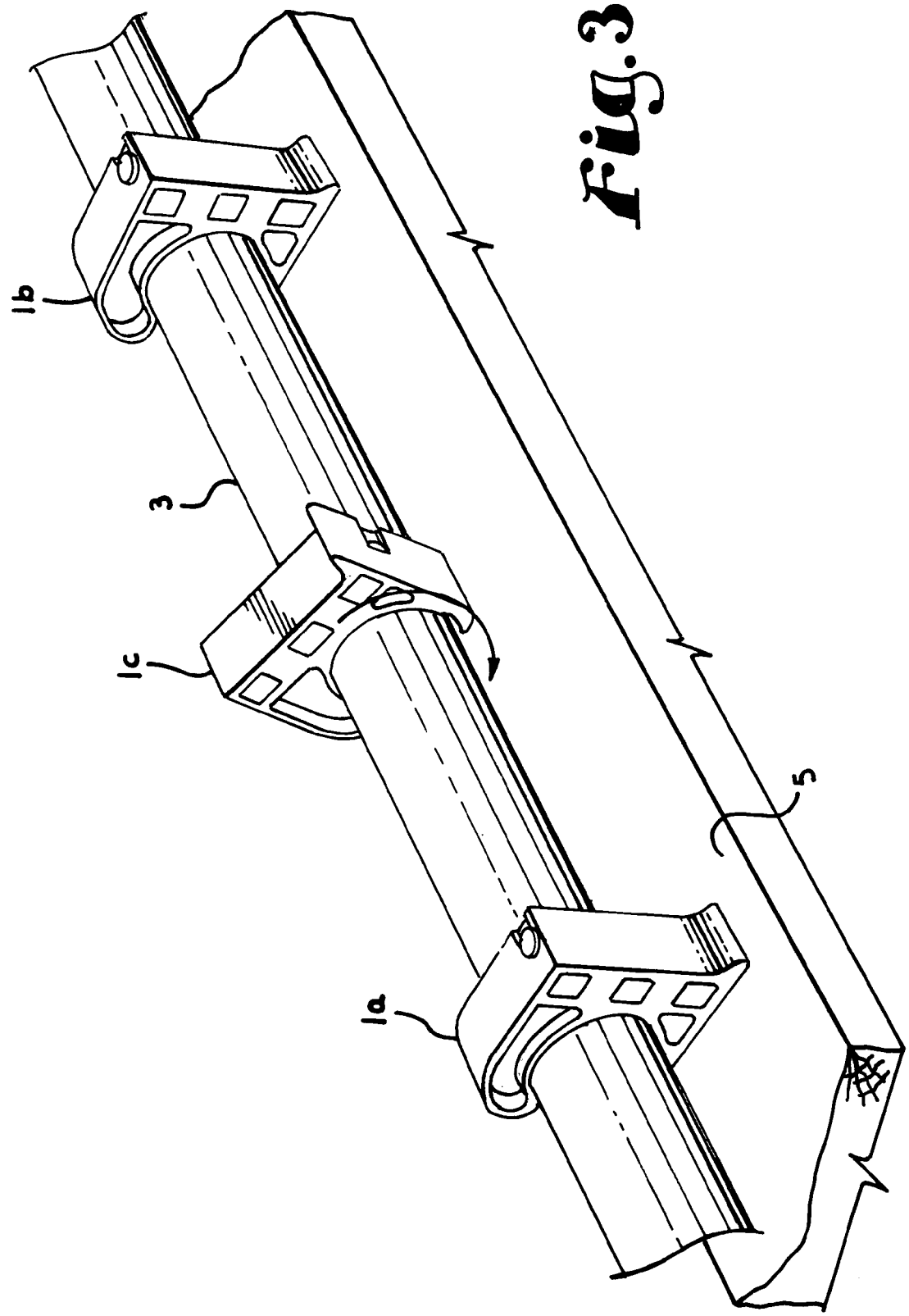

PIPE HOLD-DOWN WITH FLEXIBLE ISOLATING LEG

BACKGROUND OF THE INVENTION

1. Field of the Invention

This application relates to hold-downs for fastening a tubular conduit such as a plumbing pipe to a building member, and in particular to such a hold-down having a flexible leg which acts to isolate and insulate the pipe from the building member.

2. Description of the Related Art

Prior art hold-downs for plumbing pipe generally come in two varieties: open and full wraparound. An open hold-down generally includes a rigid back and a claw which extends outwardly from the top of the back. The back includes a nail receiving aperture. A nail extending through the aperture is driven into a building member to secure the hold-down to the building member. The pipe is captured between the claw and the building member.

A problem with this type of hold-down is that a pipe held in the hold-down will be in contact with the building member. As the pipe expands and contracts with changes in temperature it may rub against the building member causing a noise. Such noise is considered undesirable by homeowners. In addition, heat from hot water pipes can be lost through heat transfer from the pipe to the building member.

The full wraparound hold-down completely encompasses the pipe and isolates it from the building member. One type of full wraparound hold-down has a two piece back and a flexible strap which connects the two portions of the back and wraps around the pipe. Again, the back includes a nail aperture which extends through both portions of the back. The pipe is inserted into the hold-down through an opening defined between the two portions of the back. A nail is then inserted through the nail aperture and driven into the building member. The Padlock™ tube strap, manufactured by Sioux Chief Manufacturing Company, Inc. of Peculiar Missouri, is an example of this type of hold-down.

Another variant on the full wraparound type hold-down has an articulated back with a hinge joint midway along its length. A pair of claws extend outwardly from the top and bottom of the back. The hold-down is moveable between open and closed positions by bending the back at the hinge joint. In the closed position the distal ends of the claws are in contact. In the open position an opening is formed between the distal ends of the claws. The hold-down is clamped onto a pipe by moving it to the open position, inserting the pipe through the opening and then closing the hold-down around the pipe. Again, the back includes a nail receiving aperture. A nail extending through the aperture is driven into a building member to secure the hold-down to the building member. An example of this type of hold-down is the Sioux Strap™ tube hanger, also manufactured by Sioux Chief Manufacturing Company, Inc.

U.S. Pat. No. 6,073,891 to Humber discloses a hybrid open type hold-down with a generally C-shaped body with a back and a pair of legs. A pipe receiver is formed between the legs and is accessible through the opening between the legs. Each leg has a inwardly projecting protrusion adjacent the opening which acts to retain the pipe in position. The body is made of a material which is sufficiently resilient that both legs of the C-shaped member deflect outwardly for receiving the pipe past the protrusions and into the pipe receiver. Nail receiving apertures are formed through both the back and one of the legs such that the hold-down may be secured to a building member in multiple orientations. The back and the leg with the nail receiving aperture are of generally identical construction.

If the hold-down of Humber '891 is installed with a nail through the aperture in the back, one of the legs will act to isolate the pipe from the building member. If the hold-down is installed with a nail through the aperture in the leg, and the back is toward the building member, the pipe will be isolated from the building member by the back. If the hold-down is installed with a nail through the aperture in the leg, and the opening is toward the building member, the pipe will be isolated from the building member by the protrusions and the air space therebetween.

SUMMARY OF THE INVENTION

The present invention is a modified open pipe hold-down having a flexible leg which is interposed between the pipe and the building member to isolate and insulate the pipe. The hold down includes a substantially rigid back having a base end, a distal end, and a fastener receiving aperture extending therethrough from the distal end to the base end. A claw extends outwardly from the back proximate its distal end and curves downwardly toward the base end. The flexible leg extends outwardly from the back proximate its base end. The leg is substantially more flexible than either the back or the claw and is bendable relative thereto.

A pipe receiver sized to receive the pipe is formed between the claw and the inner surface of the leg. An entrance opening to the pipe receiver is defined between the distal end of the claw and the leg. The leg is bendable between a normal position wherein its outer surface is in generally planar alignment with the base end of the back and a pipe admitting position wherein the leg is bent outwardly away from the claw. In the normal position the entrance opening is substantially narrower than the outside diameter of the pipe and in the pipe admitting position the entrance opening is at least as wide as the outside diameter of the pipe so that the pipe can be inserted into the pipe receiver.

BRIEF DESCRIPTION OF THE DRAWINGS

FIG. 1 is a perspective view of a hold-down according to the present invention shown being installed to secure a pipe to a building member with the fastener partially driven in.

FIG. 2 is a front view of the hold-down of FIG. 1.

FIG. 3 is a perspective view showing a hold-down according to the present invention being installed between two previously installed hold-downs.

DETAILED DESCRIPTION OF THE PREFERRED EMBODIMENTS

Figure 4:
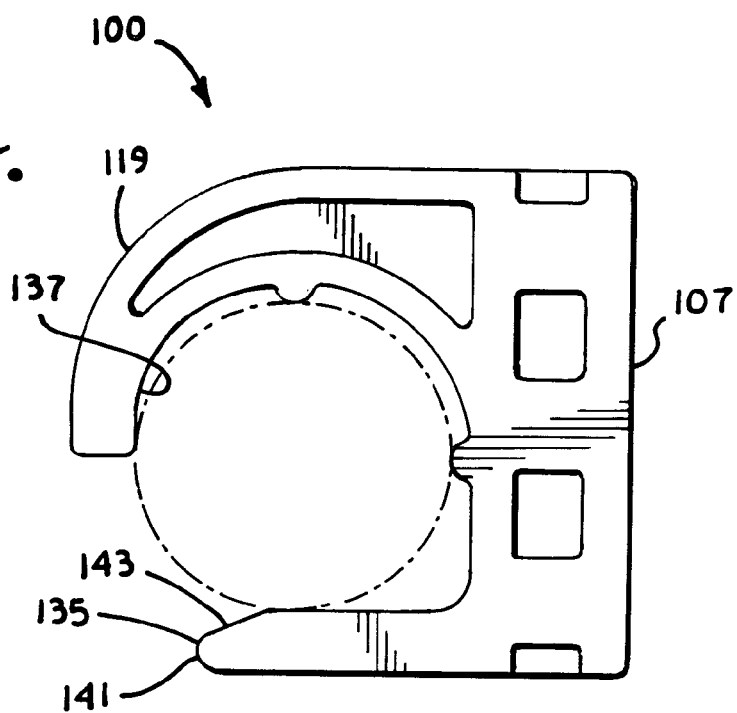
FIG. 4 is a front view of a first alternative embodiment of the hold-down.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference number 1 generally designates a pipe hold-down according to the present invention. The hold-down 1 is used to attach a pipe, conduit or other tubular member 3 (hereinafter pipe 3) to a joist, stud, or other building member 5. The hold-down 1 is of unitary construction and is preferably molded of a durable plastic, such as high density polyethylene or the like.

The hold-down 1 includes a relatively rigid back 7 having a base end 9, a distal end 11, a front face 13, a rear face 15 and opposed sides 17. A claw 19, which is also relatively rigid, extends outwardly from the front face 13 of the back 7 proximate its distal end 11 and curves toward the base end 9. The claw 19 has an outer surface 21, a generally semi-cylindrical inner surface 23, opposed sides 25 and a distal end 27. The hold-down 1 further includes a flexible isolating leg 29 which extends outwardly from the front face 13 of the back 7 proximate its base end 9. The leg 29 includes an inner surface 31, an outer surface 33 and a distal end 35. A pipe receiver 37, sized to accept the pipe 3, is defined between the inner surface 23 of the claw 19 and the inner surface 31 of the leg 29. An entrance opening 39 to the pipe receiver 37 is formed between the distal end 27 of the claw 19 and the leg 29.

In its normal, relaxed position, the leg 29 extends outwardly from the back 7 with a substantial portion of its outer surface 33 in generally planar alignment with the base end 9 of the back 7, as shown in solid lines in FIG. 2. When the leg 29 is in this normal position, the entrance opening 39 is substantially narrower than the outside diameter of the pipe 3. Because the leg 29 is flexible, however, it may be bent outwardly, away from the claw 19, in order to enlarge the entrance opening 39. The pipe 3 can, therefore, be admitted into the pipe receiver 37 by bending back the leg 29 until the entrance opening 39 is at least as wide as the outside diameter of the pipe 3. This position of the leg 29, shown in dashed lines in FIG. 2, may be denominated as its pipe admitting position. The distal ends 27 and 35 of the claw 19 and leg 29, respectively, are preferably shaped and positioned such that, as a pipe 3 is pressed into the entrance opening 39 from outside the pipe receiver 37, the leg 29 will be urged into the pipe admitting position. To this end, the distal ends 27 and 35 are shown as being convexly curved, such that inner surfaces 23 and 31 of the claw 19 and the leg 29 respectively generally circumscribe the outer periphery of the circular pipe receiver 37 when the leg 29 is in the normal, relaxed position.

The leg 29 is of a length (measured from the backmost point on the boundary of the pipe receiver 37) which is greater than or equal to the outside radius of the pipe 3 such that it extends between the pipe 3 and the building member 5 and isolates the pipe 3 from the building member 5 when the pipe 3 is seated in the pipe receiver 37. The leg 29, however, does not need to be as long as the claw 19, and is shown as being of a length wherein its distal end 35 is spaced inwardly from the distal end 27 of the claw 19. It is foreseen, however, that the leg 29 could be of a length greater than or equal to the length of the claw 19 (see FIG. 5). The inner surface 31 of the leg 29 is shown as being inwardly curved such that the inner surface 31 generally conforms to the shape of the pipe 3, however it is foreseen that the leg 29 could also be straight (see FIG. 4).

The leg 29 acts to space the pipe 3 outwardly from the building member 5, and the distance between the pipe 3 and the building member 5 is generally determined by the thickness of the leg 29 at a medial point 41 along the leg defined by the intersection of the leg with a line A normal to the outer surface of the leg and passing through the center of the pipe receiver 37. The portion of the leg 29 extending from the back 7 to the medial point 41 may be referred to as a first or inner portion thereof and in the preferred embodiment the outer surface of the leg inner portion extends in generally planar alignment with the base end 9 of the back 7. In order to allow additional hold-downs 1 to be easily inserted between previously installed hold-downs 1, it is preferable that a distal portion 43 of the leg 29, from the medial point 41 outwardly toward the distal end 35, not be substantially thicker than the thickness at the medial point 41. In other words, no part of the distal portion 43 is thicker than the distance that the pipe 3 is spaced away from the building member 5 at the medial point 41 when the pipe 3 is received in the pipe receiver 37 and the hold-down 1 is secured to the building member 5 with the leg 29 extending between the building member 5 and the pipe 3. To this end, the leg 29 is shown as having a distal portion 43 between the medial point 41 and the distal end 35 wherein the outer surface 33 curves inwardly, generally in parallel to the inner surface 31, such that the distal portion 53 of the leg 29 is not substantially thicker than it is at the medial point 41. In addition, the leg distal portion 53 preferably is less than approximately half as thick as the claw 19 and the back 7 along substantially the entire length of the claw 19 and the back 7 such that the distal portion 53 of the leg 29 is more flexible than the claw 19 or the back 7. In the embodiment shown in FIG. 2, distal portion 53 of the leg 29 is approximately no more than ⅓ as thick as the claw 19 or the back 7. As further seen in FIG. 2, the leg inner portion is thicker than the leg distal portion 53 such that a hinge or hinge point is formed proximate the leg medial point 41 and relative to which the leg distal portion 53 flexes as shown in phantom lines, The hinge or hinge point is spaced outward or forward from the back 7.

FIG. 3 shows a pipe 3 fastened to a building member 5 by hold-downs 1a and 1b. An additional hold-down 1c can be added between hold-downs 1a and 1b by snapping the hold-down 1c onto the pipe 3 from the outer or exposed side of the pipe 3 away from the building member 5 as shown. The hold-down 1c can then be easily rotated around the pipe 3 into its final position because the distal portion 43 of the leg 29 will slide between the pipe 3 and building member 5 without interfering with either.

The pipe 3 is spaced inwardly from the inner surface 23 of the claw 19 and the inner surface 31 of the leg 29 by transverse ribs 45. Four ribs 45 are shown including a first rib 45a formed as part of the distal end 27 of the claw 19. A second rib 45b is formed on the inner surface 23 of the claw 19 approximately sixty degrees from the first rib 45a. A third rib 45c is formed on the inner surface 31 of the leg 29 at a position somewhat more than one hundred eighty degrees from the first rib 45a such that a pipe 3 will snap into place between the ribs 45a and 45c when it is pressed into the pipe receiver 37 through the entrance opening 39. The ribs 45*a* and 45*c* then act to resist withdrawal of the pipe 3 from the pipe receiver 37. A fourth rib 45*d* is positioned on the leg 29 adjacent the distal end 35 thereof. The fourth rib 45*d* is flatter in profile than the ribs 45*b* and 45*c* and includes an upstanding lip 46. The flattened rib 45*d* does not make the distal portion 43 of the leg 29 substantially thicker than the thickness at medial point 41 and still allows the distal portion 43 to fit between a previously installed pipe 3 and the building member 5 without interference. Collectively, the ribs 45 act to minimize contact between the pipe 3 and the hold-down 1, thereby reducing any noise created by rubbing of the pipe 3 against the hold-down 1 as the pipe 3 expands and contracts.

The hold-down 1 includes a fastener receiving aperture 47 which extends through the back 7 from the distal end 11 to the base end 9 thereof and is securable to the building member 5 by a fastener 49, such as a nail or screw, extending through the fastener receiving aperture 47. In order to speed installation, the fastener 49 may be pre-loaded in the fastener receiving aperture 47. When the fastener 49 is tightly driven into the building member 5, the leg 29 is captured between the building member 5 and the pipe 3 and is thereby locked into its normal position. The entrance opening 39 is thus fixed at a width which is substantially smaller than the outside diameter of the pipe 3 and thereby effectively prevents withdrawal of the pipe 3 from the pipe receiver 37. When interposed between the pipe 3 and the building member 5, the leg 29 acts to isolate the pipe 3 from the building member 5 such that the two will not rub together as the pipe expands and contracts with changes in temperature.

In order for the leg 29 to be effectively captured between the pipe 3 and the building member 5, however, the hold-down 1 should be installed with the outer surface 33 of the leg 29 generally flush against the building member 5. If the hold-down 1 is tilted rearwardly (i.e. in the direction of the back 7) the leg 29 will not be properly captured, and can still be flexed into the pipe admitting position, allowing the pipe 3 to come free of the pipe receiver 37. In order to make it more likely that the hold-down 1 will be properly installed, the present invention preferably includes features designed to keep the outer surface 33 of the leg 29 generally flush with the building member 5 during installation. The first of these features is a foot 51 which extends outwardly from the rear face 15 of the back 7 adjacent the base end 9 thereof. The foot 51 provides a fulcrum about which the force of the fastener 49 acts when being driven into the building member 5, thereby pulling the distal end 35 of the leg 29 downwardly toward the building member 5.

The second feature of the hold-down 1 designed to assure proper installation is that the fastener receiving aperture 47 is at least slightly canted in a forward direction (towards the claw 19) at an angle B from the base end 9 of the back 7 to the distal end 11. Or, in other words, the fastener receiving aperture 47 is at an acute angle (ninety degrees minus angle B) relative to the outer surface 33 of the leg 29 when the leg 29 is in its relaxed position. Because of the forward angle B of the aperture 47, a force applied to the fastener 49 will necessarily have a forward component which, again, forces the distal end 35 of the leg 29 toward the building member 5. The forward angle B of the fastener receiving aperture 47 may be as little as two to three degrees to be effective.

ALTERNATIVE EMBODIMENTS

FIG. 4 shows a first alternative embodiment 100 of the hold-down of the present invention. The hold-down 100 is substantially similar to the hold-down 1 described above and includes a rigid back 107, a claw 119 and a flexible leg 129. A pipe receiving aperture 137 is defined between the claw 119 and the leg 129. The aperture 137 has an entrance opening 139. Again, the leg 129 is bendable between a normal position and an outwardly flexed pipe admitting position. The leg 129, however is generally straight as compared to the more curved leg of the hold-down 1. The leg 129 has a distal end 135 with a rounded end portion 141 having a diameter less than the thickness of the leg 129 which begins at the lower surface of the leg 129, and a tapered portion 143 which extends from the rounded end portion 141 to the upper surface of the leg 29. The shape, of the distal end 135 is selected to facilitate the movement of the leg 129 into the pipe admitting position when a pipe 3 is pressed into the entrance opening 139 from outside the pipe receiver 137. As shown, this embodiment lacks structure corresponding to the foot 51 and canted fastener receiver of the hold-down 1.

Figure 5:
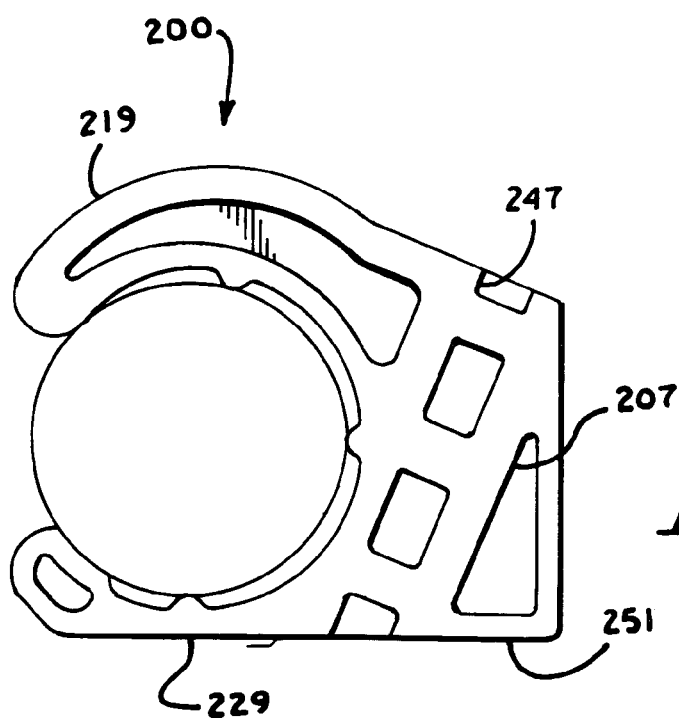
FIG. 5 is a front view of a second alternative embodiment of the hold-down.

FIG. 5 shows a second alternative embodiment 200 of the hold-down of the present invention. The hold-down 200 includes a rigid back 207, a claw 219, and a flexible leg 229. This version has a fastener receiving aperture 247 which is canted rearwardly from the base end of the back 207 to the distal end. Although such a rearwardly canted fastener receiving aperture could exacerbate the problem of properly seating the flexible leg 229 against a building member 5, this design might be desirable in installations where access to the fastener is limited by surrounding obstacles and it is necessary to drive the fastener at an angle. In order to minimize any adverse effects of the rearwardly canted fastener receiving aperture, the hold-down 1 includes an oversized foot 251 which extends rearwardly from the back 207. The flexible leg 229 is shown as having a length such that it is generally coextensive with the claw 219.

It is to be understood that while certain forms of the present invention have been illustrated and described herein, it is not to be limited to the specific forms or arrangement of parts described and shown.

What is claimed and desired to be secured by Letters Patent is as follows:

1. A pipe hold-down for securing a pipe to a building member, the hold down comprising:
 a) a back having a base end, a distal end, and a fastener receiving aperture extending substantially therethrough from said distal end to said base end;
 b) a claw extending laterally outward from said back proximate said distal end thereof; said claw having a claw distal end; and
 c) a leg connected to said back proximate said base end thereof and extending outwardly from said back in the same lateral direction as said claw to form a pipe receiver therebetween; said leg terminating at a leg distal end which is spaced apart from said claw distal end to form an entrance opening to said pipe receiver therebetween, said leg having a hinge formed therein in spaced relation from said back such that a distal portion of said leg extending outward from said hinge is more flexible than said back and said claw such that distal portion of said leg is bendable relative to said claw and said back.

2. The pipe hold-down as in claim 1 wherein said fastener receiving aperture is angled toward said claw from said base end of said back to said distal end of said back.

3. The pipe hold-down as in claim 1 further including a foot extending outwardly from said back proximate said base end thereof in the opposite lateral direction from said leg.

4. The pipe hold-down as in claim 1 wherein said leg distal end is spaced laterally inward from said claw distal end.

5. The hold-down as in claim 1 wherein said outer surface of said leg curves toward said claw proximate said distal end thereof.

* * * * *